US008804757B2

(12) United States Patent
Lu et al.

(10) Patent No.: US 8,804,757 B2
(45) Date of Patent: Aug. 12, 2014

(54) CONFIGURABLE MOTION ESTIMATION

(75) Inventors: Ning Lu, Folsom, CA (US); Hong Jiang, El Dorado Hills, CA (US); Satyaki Koneru, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 1182 days.

(21) Appl. No.: 11/964,528

(22) Filed: Dec. 26, 2007

(65) Prior Publication Data

US 2009/0168881 A1    Jul. 2, 2009

(51) Int. Cl.
*H04J 3/16*    (2006.01)
(52) U.S. Cl.
USPC .......................................................... 370/465
(58) Field of Classification Search
USPC ........... 370/477, 465; 375/240.16, 240.25–26
See application file for complete search history.

(56) References Cited

U.S. PATENT DOCUMENTS

| | | | |
|---|---|---|---|
| 5,557,341 A * | 9/1996 | Weiss et al. | 348/699 |
| 6,823,013 B1 * | 11/2004 | Boice et al. | 375/240.17 |
| 7,869,518 B2 * | 1/2011 | Kim et al. | 375/240.16 |
| 8,014,610 B2 * | 9/2011 | Chen et al. | 382/209 |
| 2004/0258154 A1 * | 12/2004 | Liu et al. | 375/240.16 |
| 2005/0175105 A1 * | 8/2005 | Gu et al. | 375/240.24 |
| 2005/0180606 A1 * | 8/2005 | Park et al. | 382/107 |
| 2006/0120452 A1 * | 6/2006 | Li | 375/240.16 |
| 2008/0192821 A1 * | 8/2008 | Malayath et al. | 375/240.03 |

FOREIGN PATENT DOCUMENTS

EP    0759679 A2    2/1997

OTHER PUBLICATIONS

Rangarajan, et al. "FPGA Implementation of High Speed Parallel Architecture for Block Motion Estimation", IEEE workshop on signal processing system, Piscataway, NJ, USA, Oct. 13, 2004, pp. 245-250.
Lee, et al. "A Fast Multi-Resolution Block Matching Algorithm and its LSI Architecture for Low Bit-Rate Video Coding" IEEE Transactions On Circuits And Systems For Video Technology, vol. 11, No. 12, Dec. 2001, pp. 1289-1301.
He, et al. "Design of Fast Motion Estimation Algorithm Based on Hardware Consideration" IEEE Transactions On Circuits And Systems For Video Technology, IEEE Service Center, Piscataway, NJ, USA, vol. 7, No. 5, Oct. 1997, pp. 819-823.
Office Action received for European Patent Application No. 08172299.3, mailed on May 8, 2009, 5 pages.
Office Action received for European Patent Application No. 08172299.3, mailed on Apr. 14, 2010, 1 page.
Office Action received for Chinese Patent Application No. 200810184919.5, mailed on Aug. 23, 2010, 17 page of Chinese Office Action including 10 pages of English Translation.
Office Action received for Chinese Patent Application No. 200810184919.5, mailed on Jan. 26, 2011, 18 page of Chinese Office Action including 10 pages of English Translation.
Office Action received for Chinese Patent Application No. 200810184919.5, mailed on Jul. 26, 2011, 5 page of Chinese Office Action including 2 pages of English Translation.

* cited by examiner

Primary Examiner — Mark Rinehart
Assistant Examiner — Peter Cheng
(74) Attorney, Agent, or Firm — Buckley, Maschoff & Talwalkar LLC

(57) ABSTRACT

In some embodiments, a motion estimation method and engine are provided. A motion estimation engine may, for example, compare source blocks from a source frame against reference blocks in a reference frame to find a suitable match for the source block. According to some embodiments, groups of reference blocks are compared at the same time against the source block, with search units within each group being selected for comparison simultaneously using both a fixed path navigation and an adaptive path navigation.

23 Claims, 9 Drawing Sheets

| WP[0] | WP[1] | WP[2] | WP[3] | WP[4] | WP[5] | WP[6] |
|-------|-------|-------|-------|-------|-------|-------|
| SU5 | SU2 | SU6 | SU8 | SU4 | Null | Null |

CONFIGURABLE MOTION ESTIMATION

BACKGROUND

A motion estimation engine (MEE) is a module used in video compression systems for producing compressed video streams. Motion estimation involves analyzing previous and/or future frames to identify matching or closely matching blocks that can be used in other frames without the need for separately storing them each time. Motion vectors pointing to the acceptable matches are then stored in place of the blocks. Unfortunately, motion estimation processes can consume excessive processing resources in identifying matches for an entire video stream file. Thus, improved approaches would be desired.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
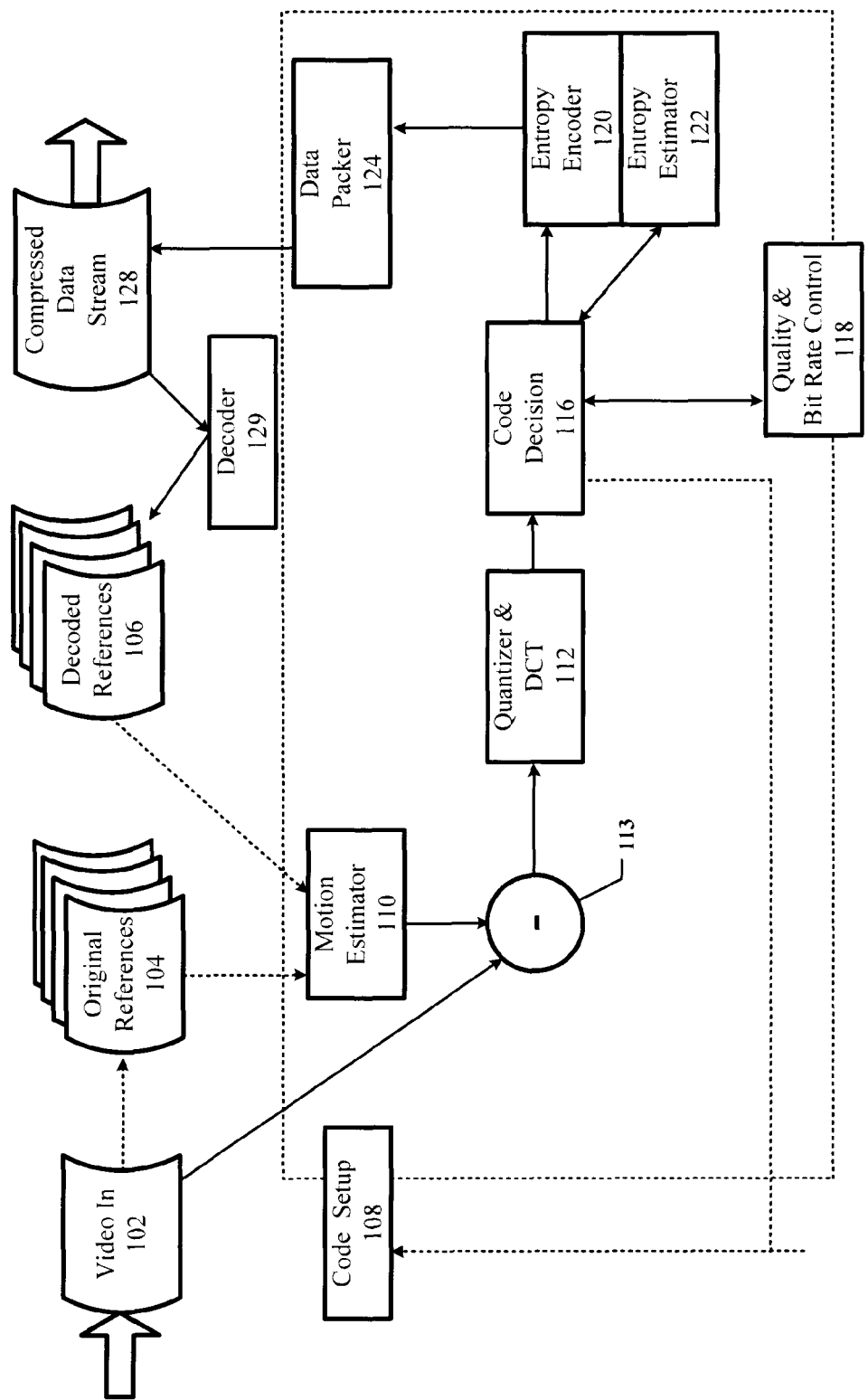
FIG. 1 is a block diagram of a video compression system in accordance with some embodiments.

With some inventive embodiments disclosed herein, motion estimation techniques are presented that can be used for compressing video files in conformance with different video standards with different coding costing requirements. In some embodiments, searching techniques for identifying matches between portions of different frames is provided that may incorporate aspects of both fixed path and adaptive (dynamic) searching. In some embodiments, a concept of a search unit (SU), which typically results in increased hardware efficiency, and an implementation of a flexible SU walk path may be provided.

Unencoded (not compressed) video stream files typically comprise large amounts of digital data to define the numerous pixels over a normally large number of frames in the file. Video compression techniques provide a method for significantly reducing the file sizes and at the same time, retaining most of the video information.

With interframe compression techniques, one or more earlier or later frames in a sequence are used to compress a current frame. Frame portions in the current frame (also referred to as the "source" frame) are matched to portions in other frames (also referred to as "reference" frames) in the file. Motion vectors, pointing to the matched portions, are then stored in the source frame instead of the actual pixel data for those portions. This can usually be done for large portions of most of the frames in the file resulting in significant file size reduction.

(As used herein, the term "frame" refers to The individual video images that make up a moving sequence. Video formats and individual clips are typically described in terms of the resolution of the individual frames, and the frame rate at which they are played. Note that a frame may or may not define a whole picture. For example, with so-called interlaced video, a technique used for television video formats, each full picture (or slide) of video is formed from alternating lines taken from a pair of frames captured at slightly different times. The two frames are then interlaced or interleaved into the alternating odd and even lines of the full video slide.)

In some schemes, frames are encoded in a generally sequential fashion, starting at the beginning of the stream and proceeding until all of he frames have been encoded. In other schemes, they may be encoded out of order. For example, with a bi-directional scheme, frames may be encoded in a staggered fashion, e.g., a firs frame could be encoded, then a third ("predicted") frame, then the second frame, in positional sequence between the first and third frames, and so on. This is referred to as a bi-directional scheme because source frames may be encoded using reference frames that may be ahead of and/or behind them.

A motion estimation engine (MEE) is typically used to search for and identify the matching portions to be referenced by motion vectors in the source frame. Depending on where a frame is within the video encoding process, it may act as a source frame, as a reference frame, or as neither a source or a reference frame. Reference frames can include frames that are previous to or subsequent from a source frame. Usually, they are within a window (e.g., 8 to 15 frames) encompassing the source frame.

FIG. 1 shows a video encoding system for encoding (compressing) a a received video input file 102 into an encoded data file (compressed data stream) 128 in accordance with a desired video format. Such a format could include, for example, AVC (Advanced Video Codac or H.264 or MPEG4), WMV (Windows Media Video), MPEG (Motion Pictures Experts Group), and many others, known today or not yet defined.

The video file encoding system has a motion estimation engine 110 to match blocks or block portions to a source frame from one or more reference frames. In this depiction, it may use original reference frames 104 and/or decoded reference frames 106. Original frames are raster frames from the input video stream, while decoded reference frames are frames that have already been encoded and then decoded in the process. Original reference frames may be employed, at least at the beginning of a process when encoded/decoded frames are not yet available.

From here, the match vector data for a source frame generated by the motion estimator 110 is provided to a residual calculation (or intra-mode evaluator) 113. It compares the vector identified matched portions against corresponding portions in the corresponding Unencoded input frame to calculate how much distortion (error) are in the matched frame portions. In some schemes, this information may be sent with the matched vector information to allow for additional accuracy and efficiency when the data is packed.

From here, the residual error data and match vector information is sent through quantizer and discrete cosine transformation (DCT) module 112. This module transforms and quantizes the vector information and residual error from the time domain to the frequency domain, which is more efficient for packing due, for example, to the wide variances in residual errors that may be present.

Next, a code decision block 116 assembles data for a frame using the transformed vector and error data based on data from a quality and bit rate control block 118 and entropy estimator block 122. From here, the code decision information goes into an entropy encoder, which determines how much resolution should be used for different frame portions depending, among other things, on the statistical likelihood and to what degree that an encoded frame portion will be accurate when re-assembled.

From here, the encoded frame data is packetized at data packet block 124 and provided as part of the output encoded (compressed) data stream 128. During this part, the frame portions for each frame are assembled into a frame and synchronization information may be added.

Figure 2:
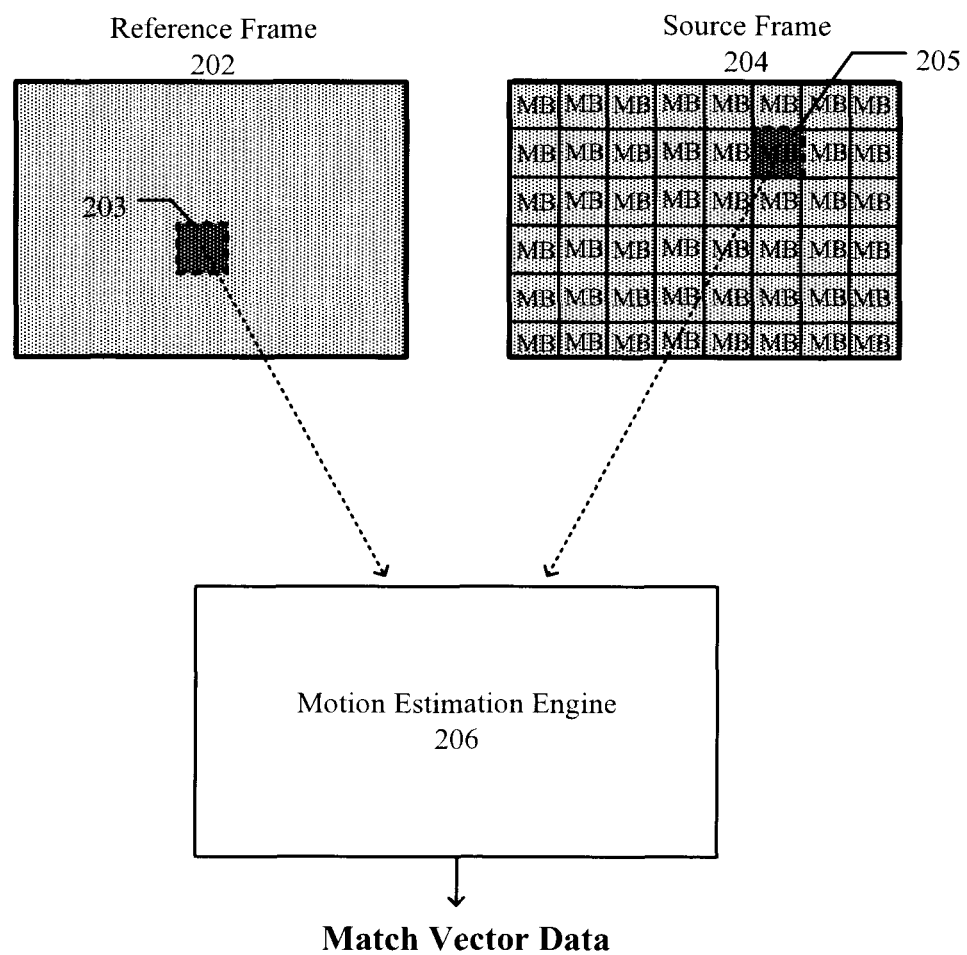
FIG. 2 is a diagram of a comparison scheme for matching macro blocks in a source frame with a block from a reference frame.

FIG. 2 conceptually shows the operation of a motion estimator 206, which could be used as a the motion estimator 110 in the system of FIG. 1. A source frame 204 that is divided into a plurality of macro blocks (MBs or simply "blocks") is provided to the ME 206. A macro block may be of any suitable size, depending upon particular design considerations. For example, in some embodiments, a macro block may consist of 8×8 or 16×16 pixels.

The ME 206 takes a source macro block 205 from the source frame 204 and looks in a reference frame 202 for a best macro block match by comparing it against candidate macro block matches 203. (Note that while it compares macro blocks from the source frame and reference frame against each other, it may determine that sub blocks (or portions) from different reference macro blocks are the best matches and define them as such.) In matching the blocks, it compares their corresponding pixel differences and calculates a distortion (error) metric for the match candidate. There are several different distortion metric methods (e.g., sum of absolute differences SAD or the so-called mean squares methodology) that may be used, and the invention is not so limited. In some schemes, the matching algorithm may go even further and compare fractional pixel components, e.g., via interpolation. For simplicity of discussion, however, this will not be addressed but may be part of a method otherwise incorporating the teachings disclosed herein.

The ME generates a record of motion vectors for each source macro block (MB) in the source frame 204. Each MB record includes one or more vectors pointing to the best portions (partitions, sub-blocks) from the reference frame for the given source macro block.

Because of hardware constraints and/or other design considerations, reference frame portions (referred to as reference windows) rather than whole reference frames may be searched against a source macro block when looking for closest matches. For example, in some embodiments, an MEE may be configured so that one or several reference windows of pixel data are fetched and loaded into a reference cache that is configured to look for reference block matches against a loaded source block. In some embodiments, one or two reference windows (or even more in other embodiments) are allowed to be loaded into the reference buffer and each window may pursue its own search path or follow a common one a reference frame can then be fully searched by separately searching its different window portions until all or a suitable overall portion of the reference frame is searched.

The memory for storing the reference window may be of any suitable size. For example, in some embodiments, it may be reasonable to use a 2K byte buffer, organized into one or two reference windows with dimensions as follows: one window of 64×32 pixels, one window of 48×40 pixels, two windows each of 40×24 pixels, or two windows of 32×32 pixels, to mention just a few. Of course, any size memory or memory partitioning may be used, depending on design considerations. (For simplicity and ease of understanding, it is assumed that each pixel in a reference or source frame is defined with a byte of memory. However, a pixel may correspond to any suitable memory unit, depending on such things as the utilized standard, desired resolution, and/or stage in the encoding process.)

When the reference window (windows) are loaded, the loaded source block is then compared against macro blocks in the reference window to find a "desired match", i.e., sufficiently close or the closest match that is available or is reasonably available. The reference blocks to be compared, as well as what order they are compared, is determined by the employed search method, discussed in more detail below.

Figure 3A:
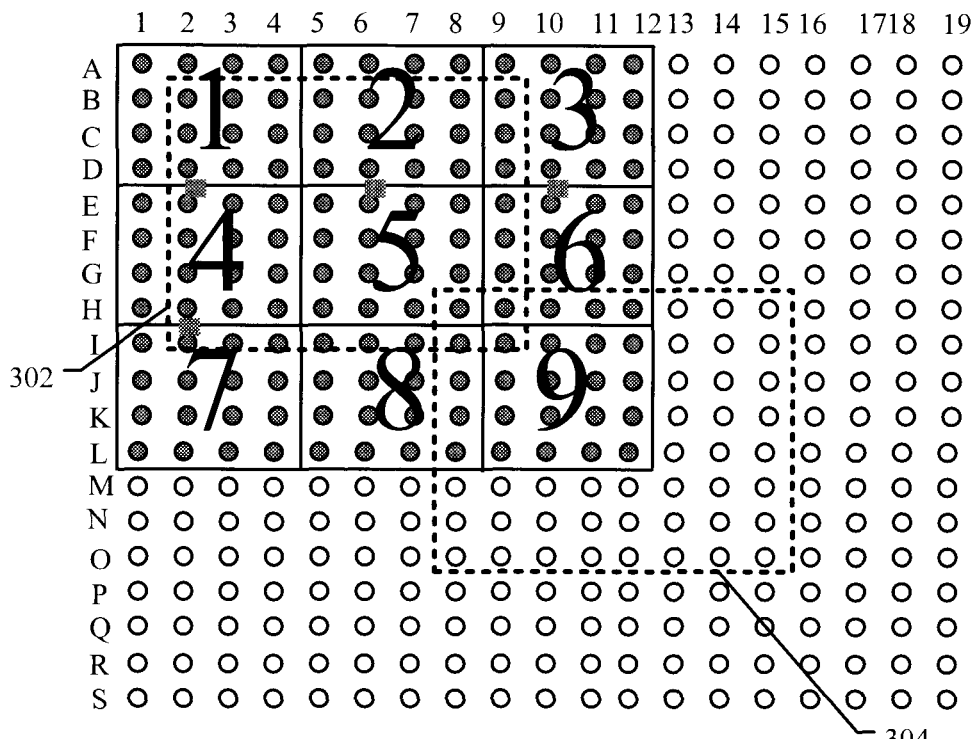
FIG. 3A is a diagram showing a reference frame portion divided into rectangular search units in accordance with some embodiments.
Figure 3B:
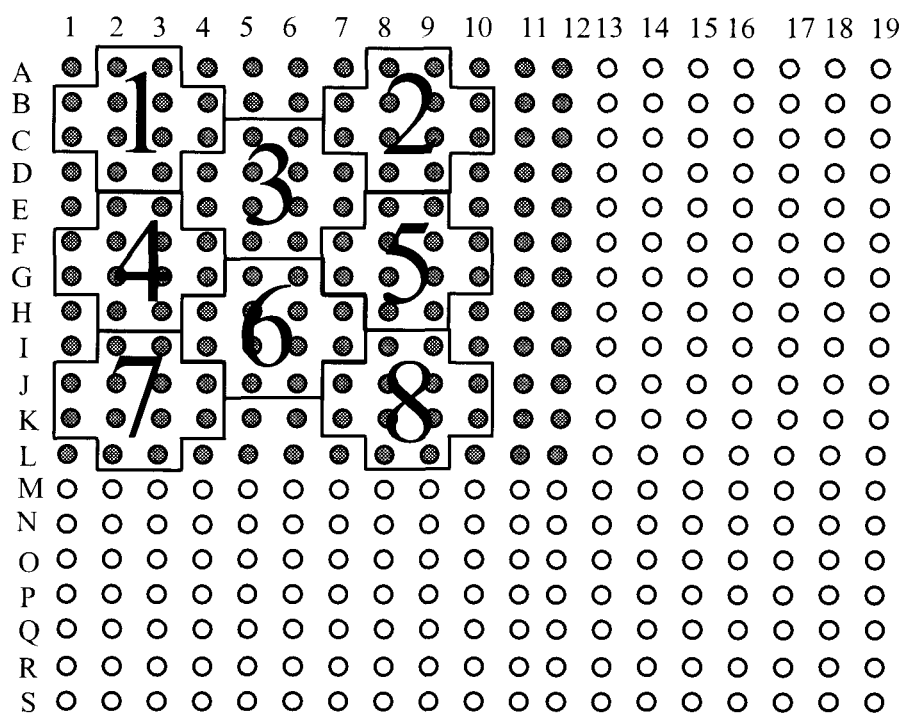
FIG. 3B is a diagram showing a reference frame portion divided into cross-shaped search units in accordance with some embodiments.

FIGS. 3A and 3B show two examples of reference windows. For simplicity, the depicted windows are only 19×19 pixels in dimension, but it should be appreciated that as just described, loaded reference windows can, and likely will in most applications, be larger.) It is assumed that with this example, the size of a source or reference macro block (MB) is 8×8 pixels. Because, with this embodiment, whole source and reference blocks are compared against each other, the valid blocks that can be searched are whole blocks with 8×8 pixels. With this example, valid blocks that can be compared are identified with the pixel in their upper left-most corner being shaded. For example, dashed box 302 identifies macro block [B, 2], while dashed box 304 identifies macro block [H,8]. (The blocks with non-shaded, identifying pixels extend out of the window and thus cannot be compared unless the window is re-loaded so that they are shifted to be sufficiently within the window.)

In some embodiments, it is more efficient, from a hardware standpoint, to configure a reference window buffer, source buffer and comparison logic so that a number of macro blocks from the reference window are simultaneously compared against the loaded source block. Accordingly, the depicted reference windows are grouped into search units (SUs). In FIG. 3A, there are 9 square-shaped SUs numbered "1-9" with each SU defining sixteen blocks to be compared. FIG. 3B, on the other hand, has cross-shaped SUs numbered "1-8" each defining twelve blocks to be compared. These different examples are to illustrate that there are numerous different ways to define a search unit by its size and shape, any of which could be suitable under the right circumstances depending on particular design considerations.

The SUs, selected to be compared, and in what order they are to be compared may be implemented in various different ways. For example, with some embodiments of the invention, the selection and order of SUs to be compared is defined using a combination of both fixed and dynamic strategies. A fixed strategy may involve, for example, the use of a fixed "walking path", while dynamic strategies may involve dynamic or adaptive paths where next SUs to be compared are determined based on prior comparison results.

A walk path (WP) is a predefined sequence of search units. The search units may be predefined before compression or during compression, but they are typically predefined before searching begins for a given source block. For example, they could be defined in a look-up table based on a source block's position within a frame. The number of SUs in a walk path (WP) is referred to as the length of the walk path (denoted by LenWP in this disclosure). The WP length could be relatively long, e.g., up to the total number of search units for a reference window or reference frame, or they could be relatively small, e.g., focusing on the highest likelihood(s) for desired matches.

Figures 4, 5:
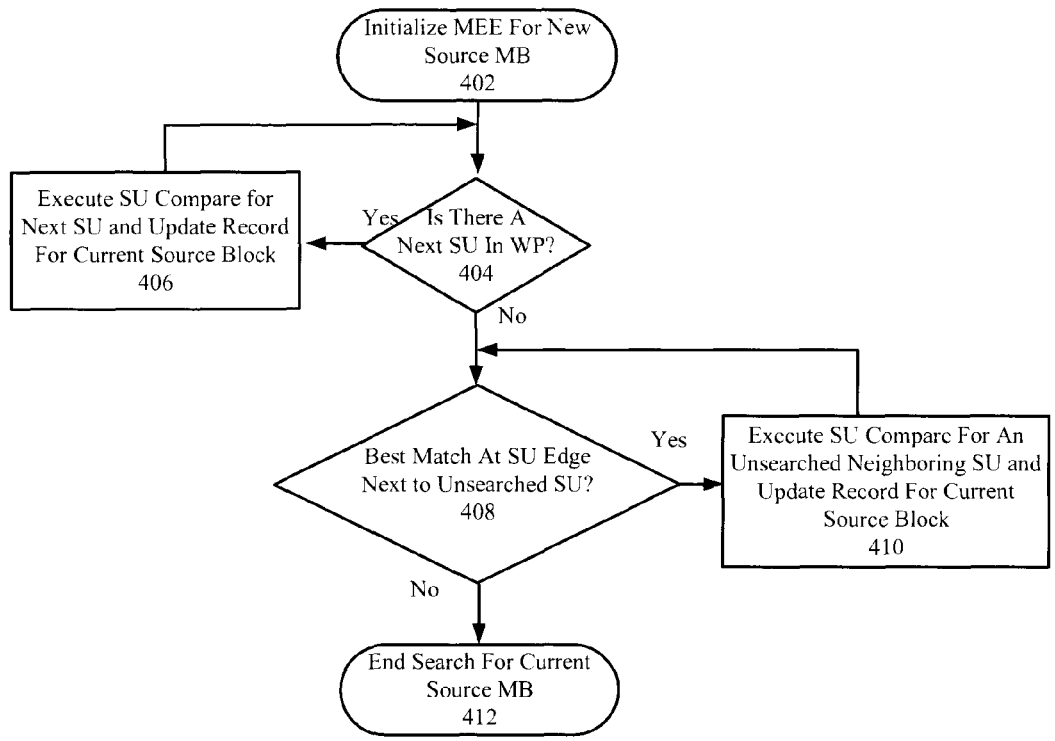
FIG. 4 shows a routine for searching a reference window to identify a suitable macro block match.
FIG. 5 shows an exemplary walk path that could be used with the reference window portion of FIG. 3A or 3B.

FIG. 4 shows a routine for searching a reference window to identify a suitable macro block match, and FIG. 5 shows an exemplary walk path for the reference window portion of FIG. 3A or 3B. At 402, the motion estimator (or Motion estimation engine MEE) is initialized for comparing reference window blocks against a new source block. Next, at 404, it determines if there is a next SU available in the walk path (WP). (Among other things, initialization at 402 would likely set the first SU, SU5 with this example of FIG. 5 for the walk path), as the first "Next" SU. If there is a next SU, the routine proceeds to 406 and executes an SU compare for the Next SU, updates the record for the current source macro block and loops back to 404. It continues with this loop until each of the SUs in the walk path have been compared in the order that they are listed.

When an SU compare operation is performed, the current source macro block is compared against the reference macro blocks identified by the selected (Next) SU. In some embodiments, these comparison operations are performed substantially at the same time. That is, arithmetic and comparison logic used to implement the comparison may be configured, in connection with the reference window and source MB buffers, to read the pixel values for the identified reference blocks and source blocks and provide them to the appropriate logic to implement the compare operations.

For the reference window of FIG. 3A, there are sixteen reference MBs identified in each SU, so a compare operation includes the separate comparisons of the source block against the sixteen different reference blocks identified by the SU. For each block comparison, it calculates one or more distortion metrics indicative of the difference between the source block and the compared reference block. Accordingly, one or more quantitative results (e.g., integer values) will typically be generated for each source/reference macro block comparison.

Any suitable distortion metric method could be used. For example, in some embodiments, the sum of the absolute differences (SAD) is employed. A SAD approach involves taking the absolute differences between corresponding pixels in the source and reference blocks being compared and summing them together to obtain an overall SAD result for the block comparison. In some embodiments, results may be generated for the whole block, as well as for different corresponding partitions. Thus, with the use of this approach, one or more integer results for each compared source/reference block is produced.

For a distortion metric value, the smaller the number, the closer the match. The values for each comparison may be retained and later evaluated for selection of a match to be referenced as a motion vector in the source frame. Alternatively, as is the case in some embodiments, the obtained results may be compared, in real time, against each other to retain the best results from reference block to reference block as the searching is proceeding. In this way, less memory may be required in the MEE hardware. Accordingly, "updating" a record in response to an SU comparison operation generally refers to storing any or all of the obtained distortion metric results and/or comparing them against one another and saving a reduced number of the results or modified versions of the same based on the comparisons.

When there is no next SU left (when the next SU is Null in FIG. 5), then at 404 it goes onto 408. Thus, operations 404 and 406 correspond to comparing the SUs in the walk path in the order that they are listed. With the exemplary walk path of FIG. 5, at this point in the routine, search units 5, 2, 6, 8 and finally, 4, would have been compared in the listed order, and the results (or at least some of the results, e.g., the best matches currently obtained) retained from these comparison operations.

At decision block 408, the routine determines if the best macro block match occurred at a boundary of an unsearched neighboring SU. If not, it proceeds to 412 and ends for the current source macro block. On the other hand, if the closest match found was for a reference MB at the edge of an SU and the neighboring SU had not been compared, then it executes a compare operation for the neighboring SU at 410 and loops back to 408. (Note that there may be multiple unsearched neighboring SUs. For example, if the best MB was at a corner of an SU, then there could be several, e.g., three unsearched neighbors, which could all be compared or just some, depending on design considerations and/or on new results from the current or next SU compare operation.)

This loop continues until there are not any unsearched (not compared) SUs bordering a closest match at an edge of a previously searched SU. The routine then proceeds to 412 and waits until the next source MB is loaded.

Figure 6:
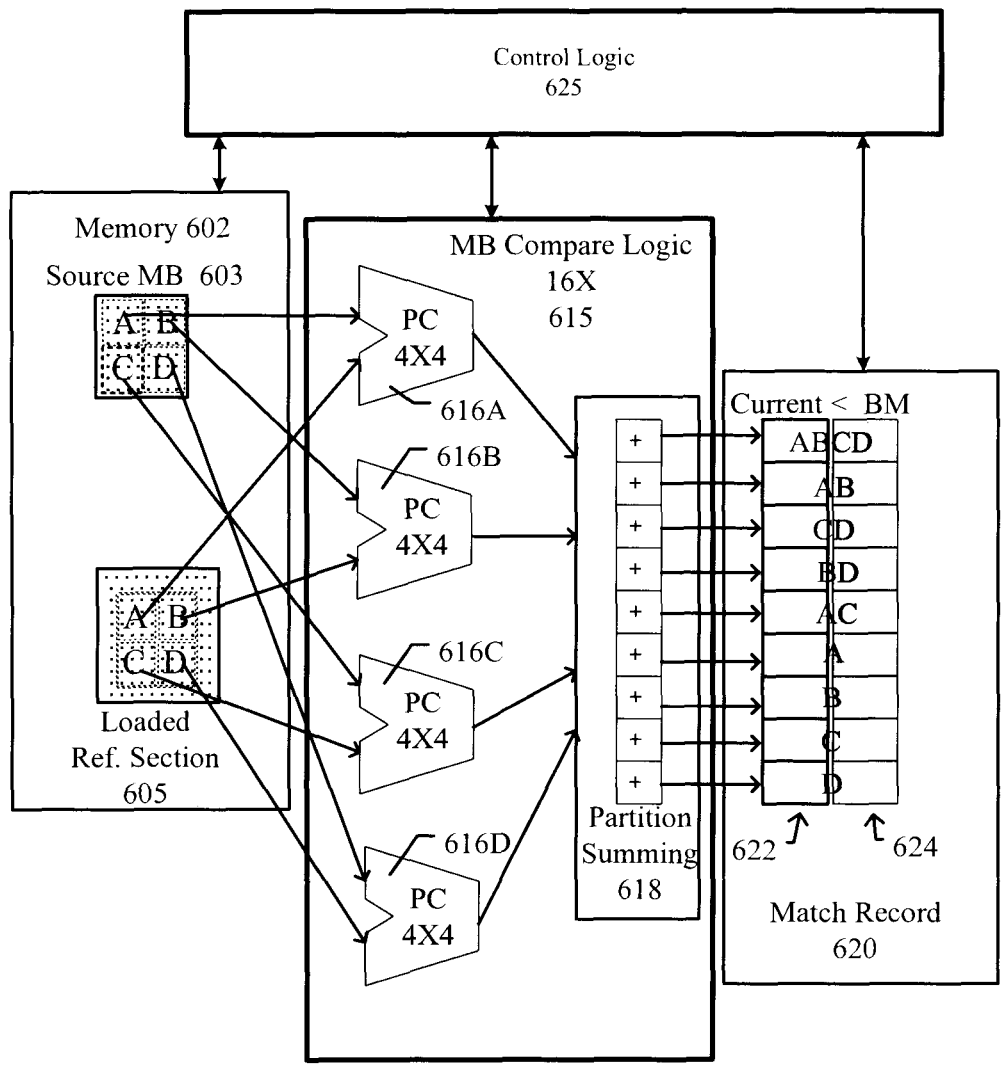
FIG. 6 is a block diagram of a portion of a motion estimation engine in accordance with some embodiments.

FIG. 6 shows an MEE engine in accordance with some embodiments. The MEE engine comprises memory 602, MB compare logic 615, match record 620, and control logic 625 coupled to one another as shown. In this embodiment, an 8×8 macro block is used, and the MEE generates distortion metric values for nine separate source/reference block partition combinations. This provides additional information to allow for flexibility in finding a suitable or even a best match. The macro blocks are divided into four 4×4 partitions (labeled as: A, B, C, D), and the MEE generates compare results for comparisons of the different partition combinations from the source block against the reference block the different partition combinations are shown in the match record 620. They are: ABCD (whole macro blocks compared); AB, CD, AC, BD (the corresponding 4×8 and 8×4 half-blocks compared against each other), and A, B, C, D (the corresponding 4×4 quarter-blocks compared against each other).

The memory 602 has a source macro block section 603 and a reference window section 605. It may be implemented with any suitable memory structure such as static random access memory (SRAM) used, e.g., for cache or with dynamic register structures, to mention just a few. With an 8×8 macro block in this example, the source section 603 should have at least 64 pixel bytes, each large enough to suitably store pixel information for a source macro block. Similarly, the reference section 605 should be large enough to store the number of pixel bytes for the implemented reference window, e.g., 32×64, 64×64, etc.

The MB compare logic 615 comprises arithmetic logic to perform distortion metric computations for the reference blocks identified by a search unit. In this example, a search unit identifies 16 reference blocks and so there are 16 compare logic instantiations to perform the sixteen separate source to reference block comparisons. It should be appreciated that the instantiations may comprise separate, similar circuits or could include some portions that are separate and others that are common to the separate circuit instances. In addition, it could perform the arithmetic operations synchronously, asynchronously, or both synchronously and asynchronously to varying extents. In some embodiments, the calculations in the compare logic 615 may be performed in one clock pass while new reference blocks for a new search unit are being loaded into the compare logic block for computation in the next pass.

In the depicted embodiment, the compare logic 615 comprises four separate partition compare (PC) blocks, 616A to 616D, to generate separate distortion metric values for comparisons between corresponding source/reference block partitions (A, B, C, D) and partition summing logic 618 to combine the compare results for the partitions to generate the nine separate partition combination values. The PC and summing logic may be configured to perform any desired distortion metric calculation. For example, it could perform SAD (sum of absolute differences) or mean-square calculations. SAD distortion computations may be suitable, for example, in some applications given their simplicity in hardware implementation.

From each PC block, a distortion metric calculation is performed and a value (e.g., integer value) is provided to the partition summing block 618. Here, the values for the four partitions are combined (summed) in appropriate combinations to provide the values for the separate partition combinations indicated in the match record 620. (It should be appreciated that partitions of any desired or otherwise suitable size could be employed, depending among other things, on hardware considerations and programming flexibility that is desired to be provided to a user. In some embodiments, separate partition metrics may or may not be needed or made available, or the hardware could be designed so that selective combinations are offered to a user.)

The match record 620 has storage cell sections, 622 and 624, to hold a current value for each partition combination and a best match (BM) for each partition combination, respectively. In general, a match record may comprise any suitable memory structure to hold distortion metric results for one or more different partition combinations for the different reference blocks or, as is the case in this depiction, for a current block and for the best matches obtained so far. In the depicted figure, the distortion values in the current record section 622 are compared with their counterpart in the best match section 624. The value in the BM section is replaced with the value from the current section if the current section value indicates less distortion (e.g., when SAD is used, if the value is smaller). An advantage of such an approach is that less memory will typically be required. That is, only the best matches (obtained so far) for each partition combination are kept.

The match record 620 nay include multiple instances of the current section or may have other suitable circuitry to buffer the generated values from the sixteen different sets of compare logic. That is, when the compare logic performs compare operations, in parallel or substantially within a common time frame such as one or more clock cycles, sixteen separate sets of compare results are produced at around the same time. Thus, these sixteen separate sets of results should be maintained, at least until it is confirmed that they are or are not BM (best match) values.

The arithmetic logic may be implemented in any suitable way. For example, the sixteen values could be separately compared against BM values, e.g., in the BM section 624. Alternatively, branches of suitable comparators could be employed, e.g., in the compare logic 615, to efficiently compare the sixteen sets of values against each other to obtain the best values from the sixteen result sets and then provide these best values to the current record section. For example, a so called divide-and-conquer tree type logic structure could be used. There may be many different suitable ways to implement the actual arithmetic circuitry. It could be done synchronously or asynchronously and could involve more or less circuit blocks, depending on desired trade-offs between cost, efficiency, and desired flexibility.

Figure 7:
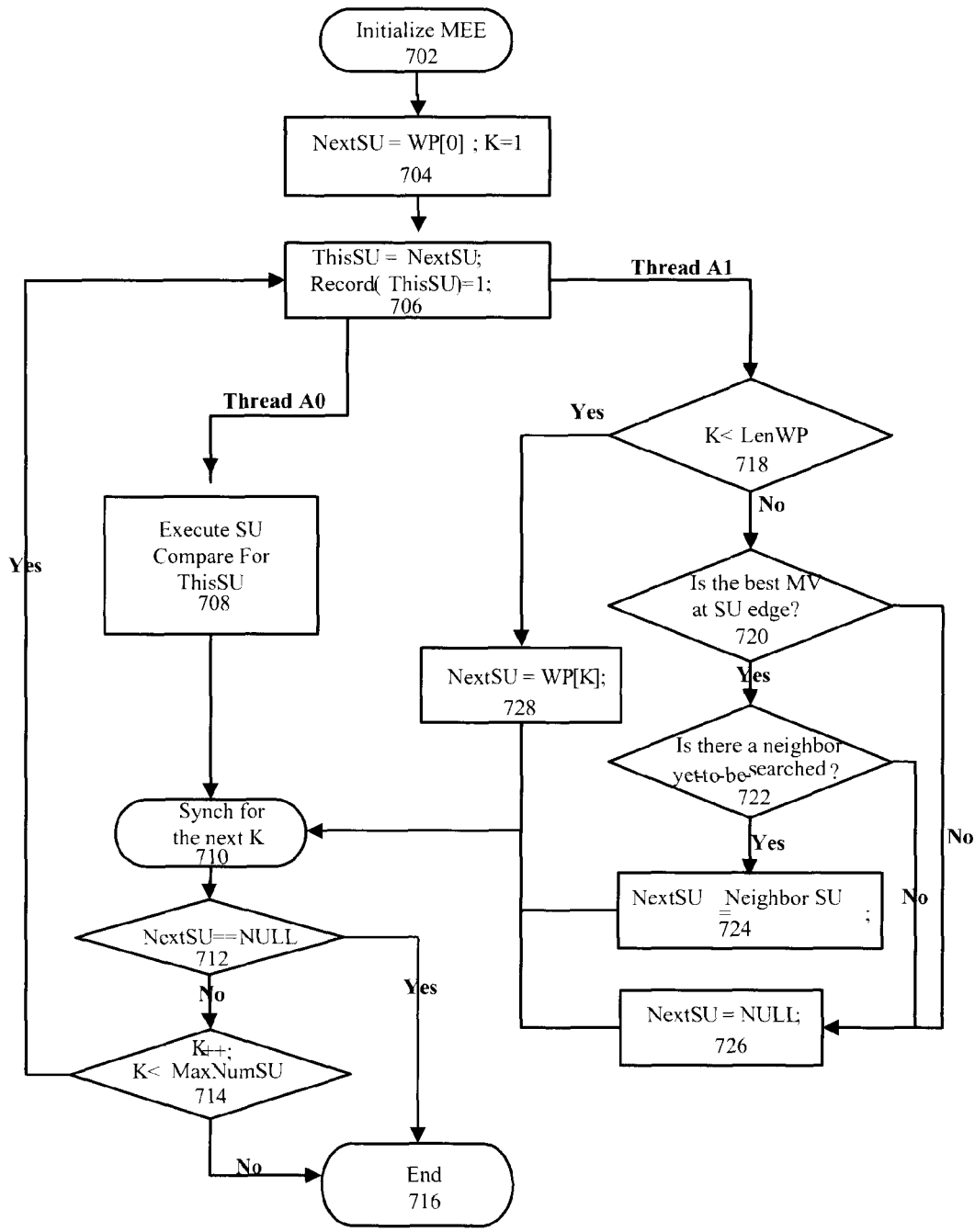
FIG. 7 is a flow diagram showing a routine for searching a reference frame portion in accordance with some embodiments.

FIG. 7 shows a routine using a single reference window for comparing search unit sets of reference blocks against a source block, for example, with the MEE of FIG. 6. The routine is generally divided into two separate threads: A0 and A1, which can execute at the same time. A0 is generally responsible for executing the SU comparisons (SU searching), while A1 is generally responsible for determining the "next" search unit (SU) to be searched. Note that with this embodiment, once thread A1 gets into the adaptive search stage, it bases its decision as to what the next SU should be one SU behind what is presently being searched. That is, there is a delay from when the current searched SU is being searched to when it is available for the A1 thread. The hardware used to execute this routine may be made with a processing structure for each thread.

At 702, the MEE is initialized. Next, at 704, a NextSU variable is assigned the first SU (WP[0]), and a counter K is assigned the value 1. At 706, a variable ThisSU is assigned the NextSU search unit address and a Record for that SU (ThisSU) is assigned the value 1 to indicate that it will be searched.

From here, the routine proceeds down two separate threads: Thread A0 corresponding to the fixed walking path portion of the routine and Thread A1 corresponding to an adaptive (or dynamic) portion of the routine. For the Thread A0 path, at 708, a SU compare operation is executed for ThisSU. Next, at 710, the routine synchronizes the threads against each other, e.g., so that decisions made in thread A1, based on events or conditions in A0, are accurate and so they don't independently "loop" without taking into account material conditions that may have changed in the other thread. Another way to think of this is that in embodiments where separate hardware processing logic units are used to execute each thread, this step allows either to wait for the other to get needed data.

At 712, the routine determines if NextSU is Null. (this is the variable, not the next SU.) If it is not Null, then at 714, K is incremented, and the routine determines if K is less than a MaxNumSU value, which is a preassigned constant corresponding to the maximum number of SUs in a reference window. If K is less than this value, the routine loops back to 706 and proceeds as described. (Note that as addressed with discussion of Thread A1, the NextSU for this loop effectively gets incremented, i.e., pointed to the next SU in the walk path, at 728 in Thread A1.)

This loop continues until each SU in the walk path (WP) is compared, when at 712, the NextSU is Null and the fixed path (Thread A0) portion will then proceed to the end at 716. (This does not mean that the routine as a whole is finished. The adaptive thread (Thread A1) may and likely will still be executing.)

Now with regard to the next SU decision portion (Thread A1), at 718, the routine determines if K is less than the length of the walking path (LenWP) i.e., the number of SUs in the walk path. If so (indicating that it it is still performing the fixed path walk through portion), then at 728, it assigns to NextSU the Kth SU in the walk path, which will be the next SU in the walk path due to K incrementing at 714.

On the other hand, at 718, if K is not less than LenWP (indicating that the last SU in the WP has been or is being compared), then the routine proceeds to 720 and determines if the best motion vector (reference block match) was at the edge of a SU, If so, it proceeds to 722 to determine if there is a neighbor SU at that edge yet to be searched. If not, it goes to 726 and assigns NextSU as Null, which ends the routine.

On the other hand, if there was a neighbor SU yet to be searched, then NextSU is assigned that neighbor and the routine goes to 710 to insert back into the SU compare execute loop so that this neighbor is searched. This adaptive loop (through 722 and 724) proceeds to execute unsearched neighbors, so long as they exist at the boundaries of SUs with best matches. Finally, when there is no remaining unsearched neighbors to best match motion vectors, then at 724, the routine goes to 726, assigns NextSU as Null and ends until the next source block is compared.

Figure 8:
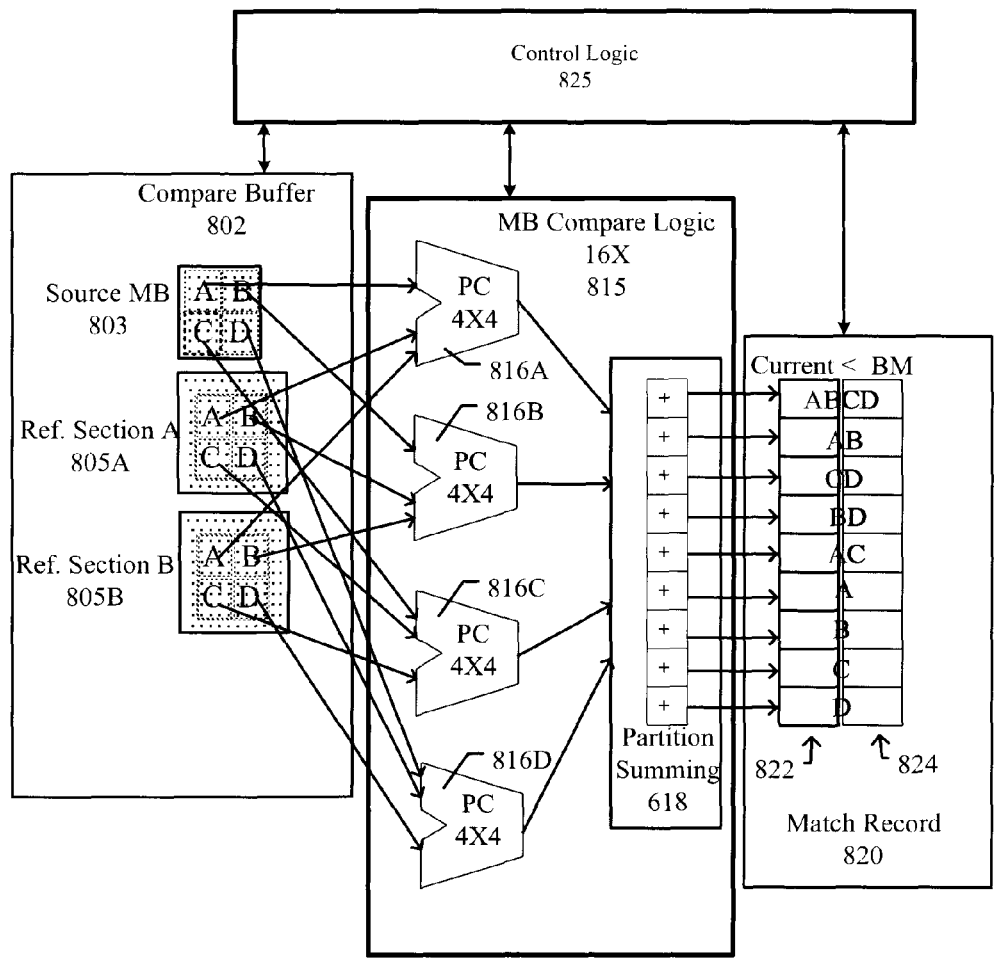
FIG. 8 is a block diagram of a portion of a motion estimation engine for searching two reference frame portions in accordance with some embodiments.

FIG. 8 shows another MEE embodiment. This MEE is similar to the MEE of FIG. 6 except that it allows for two reference windows (805A, 805B) to be loaded into the memory 802. With this configuration, each reference window may be searched with its own search path, or alternatively, a common path could be employed. In some embodiments, it comprises a processing section to execute a search (SU comparison) thread and a processing section to perform a next SU decision thread.

Figure 9:
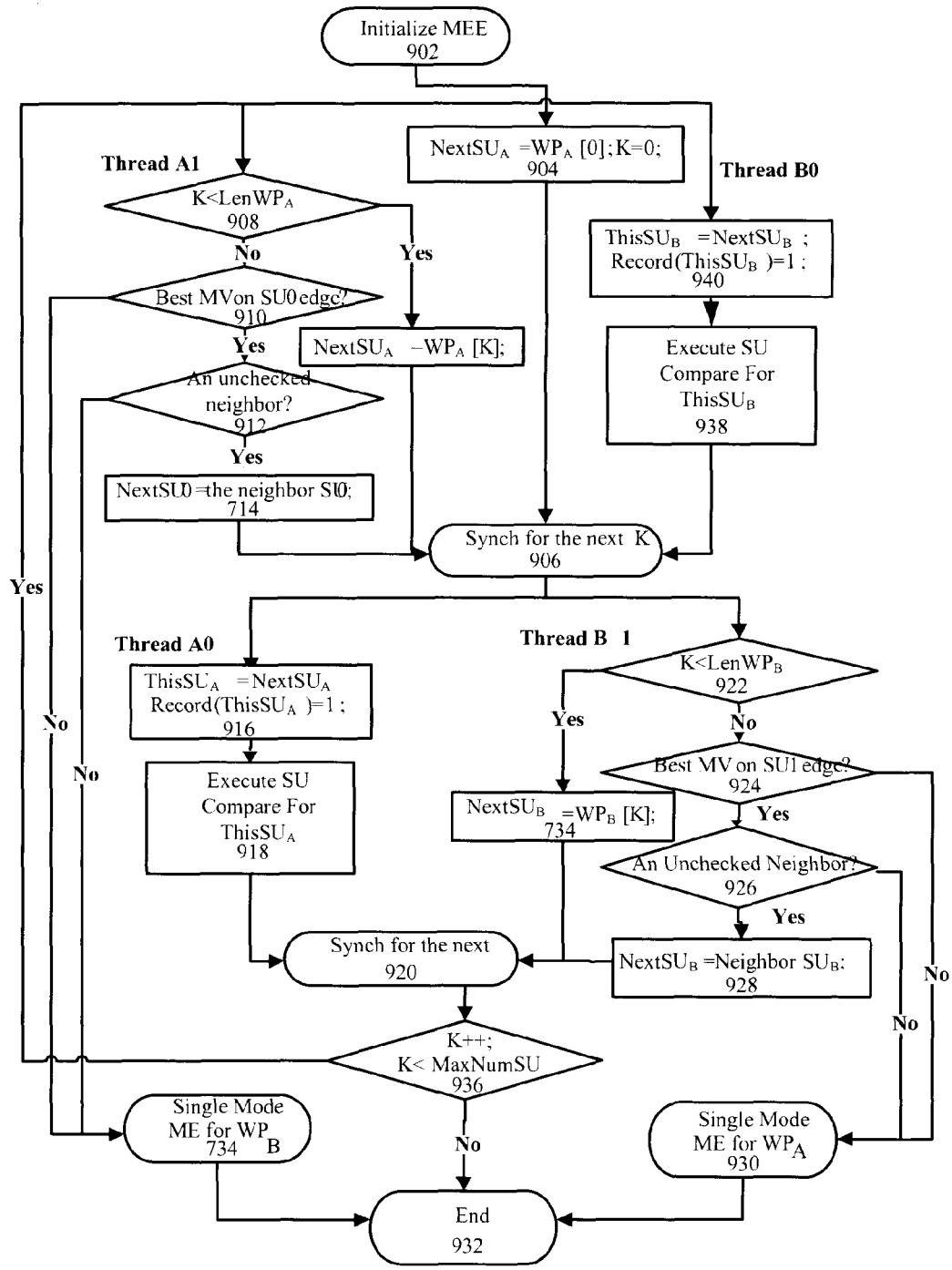
FIG. 9 is a flow diagram showing a routine for simultaneously searching first and second reference frame portions in accordance with some embodiments.

As is implemented in the dual-window search routine of FIG. 9, with two windows, there may be two separate sets of search and next SU decision threads (to be performed in single search and next SU processing sections). Thus, in some embodiments with this situation, the hardware may "ping pong" (alternate) between the two windows for each thread type. with this approach, the search thread (for each window) has a chance to catch up to its associated next SU decision thread, i.e., the decision for the next SU (in adaptive part of routine) is more likely to be up-to-date with the search thread and make decision on "best" match to date. The routine of FIG. 9 effectively combines two versions of the routine from FIG. 7 to independently search two separate windows. Threads A0 and A1 correspond, respectively, to search and next SU threads for the first window, while threads B0 and B1, respectively, correspond to search and next SU threads for a second window.

Note that in some embodiments, the MEE could be made to include multiple processing sections for simultaneously executing multiple search and next SU threads and thus, the invention is not limited to that just described. However, it does provide an efficient approach for simultaneously searching multiple windows without using excessive hardware. In addition, in some embodiments, with multiple windows searched at the same time (with or without multiple thread processing sections), best matches obtained from each window may be merged (combined) to obtain an overall best result for the windows. For example, the saved vector could point to multiple block portions from the different windows and could even weight them, e.g., in an extrapolative manner.

Figure 10:
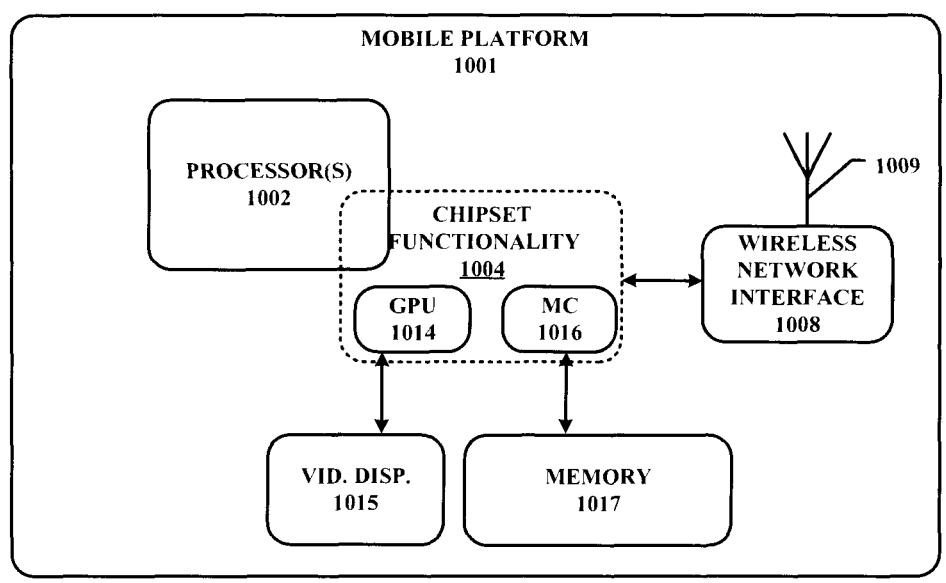
FIG. 10 is a portion of a mobile platform according to some embodiments.

With reference to FIG. 10, one example of a portion of a mobile platform 1001 (e.g., computing system such as a mobile personal computer, PDA, cell phone, or the like) is shown. The represented portion comprises one or more processors 1002, chipset control functionality 1004, video display device 1015, memory 1017, wireless network interface 1008, and an antenna 1009. The processor(s) 1002 is coupled to the wireless network interface 1008 through the chipset functionality 1004 to communicatively link it with a wireless network via antenna 1009. The chipset functionality may comprise one or more circuit blocks to perform various interface control functions (e.g., memory control 1016, graphics processing unit (GPU) 1014, I/O interface control, and the like. These circuits may be implemented on one or more separate chips and/or may be partially or wholly implemented within the processor(s) 1002. The memory control functionality couples the processor(s) to memory 1017, while the graphics processing unit is coupled to the video display device 1015 to provide a visual interface to a user. The GPU functionality 1015 comprises a Motion estimation engine, as described herein, to allow the chipset functionality 1004 and/or processor(s) 1002 to perform effective video encoding.

In the preceding description, numerous specific details have been set forth. However, it is understood that embodiments of the invention may be practiced without these specific details. In other instances, well-known circuits, structures and techniques may have not been shown in detail in order not to obscure an understanding of the description. With this in mind, references to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the preceding description and following claims, the following terms should be construed as follows: The terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

The term "PMOS transistor" refers to a P-type metal oxide semiconductor field effect transistor. Likewise, "NMOS transistor" refers to an N-type metal oxide semiconductor field effect transistor. It should be appreciated that whenever the terms: "MOS transistor", "NMOS transistor", or "PMOS transistor" are used, unless otherwise expressly indicated or dictated by the nature of their use, they are being used in an exemplary manner. They encompass the different varieties of MOS devices including devices with different VTs, material types, insulator thicknesses, gate(s) configurations, to mention just a few. Moreover, unless specifically referred to as MOS or the like, the term transistor can include other suitable transistor types, e.g., junction-field-effect transistors, bipolar-junction transistors, metal semiconductor FETs, and various types of three dimensional transistors, MOS or otherwise, known today or not yet developed.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chip set components, programmable logic arrays (PLA), memory chips, network chips, and the like.

It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

It should be appreciated that example sizes/models/values/ ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS, for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. A chip, comprising:
    block compare logic to simultaneously compare a source block against multiple reference blocks from one or more reference windows for a reference frame, the reference blocks organized into a plurality of search units, each search unit defining at least two macro blocks, wherein a macro block comprises a block of 8 by 8 pixels or 16 by 16 pixels, and wherein the one or more reference window has a plurality of different search units; and
    control logic coupled to the block compare logic to control it to execute block comparisons and generate error information for blocks in search units, wherein search units are selected in accordance with both fixed path navigation and adaptive path navigation, wherein fixed path navigation comprises a predefined sequence of search units based on the source block's position within a current frame where the search units are predefined before searching the source block begins, wherein adaptive path navigation comprises search units that are dynamically determined based on prior comparison results and wherein adaptive path navigation is synchronized with fixed path navigation by taking into account conditions associated with the fixed path navigation.

2. The chip of claim 1, in which the block compare logic has partition comparators to compare corresponding sub blocks from a source and reference block being compared.

3. The chip of claim 1, comprising match record logic to store the error information.

4. The chip of claim 3, in which the match record logic stores error information for the reference block closest to the source block.

5. The chip of claim 4, in which the match record logic stores error information for block and sub block comparisons.

6. The chip of claim 1, in which the fixed path navigation includes selecting search units based on a predefined walk path and the conditions associated with the fixed path navigation comprise a counter that is compared to a length of the walk path.

7. The chip of claim 1, in which the control logic controls the compare logic to execute compares for two or more reference windows using a separate fixed and adaptive navigation for each window.

8. The chip of claim 7, wherein best matches from each window are merged together to generate an overall best match for the two windows.

9. The chip of claim 7, in which a common processing section is used to alternate between the two windows to execute SU comparisons for the windows against a common source frame.

10. A chip, comprising:
    memory to store a source block and one or more reference windows each having multiple reference blocks grouped into search units each search unit defining at least two macro blocks, wherein a macro block comprises a block of 8 by 8 pixels or 16 by 16 pixels;
    block compare logic to compare the source block against the multiple reference blocks in a selected search unit and generate error results for each source/reference block comparison; and
    control logic to control the block compare logic to execute block comparisons and generate error information for blocks in search units, wherein search units are simultaneously selected in accordance with both fixed path navigation and adaptive path navigation, wherein fixed path navigation comprises a predefined sequence of search units based on the source block's position within a current frame where the search units are predefined before searching the source block begins, and wherein adaptive path navigation comprises search units that are dynamically determined based on prior comparison results and wherein adaptive path navigation is synchronized with fixed path navigation by taking into account conditions associated with the fixed path navigation.

11. The chip of claim 10, in which the block compare logic has partition comparators to compare corresponding sub blocks from a source and reference block being compared.

12. The chip of claim 10, comprising match record logic to store the error information.

13. The chip of claim 12, in which the match record logic stores error information for the reference block closest to the source block.

14. The chip of claim 13, in which the match record logic stores error information for block and sub block comparisons.

15. The chip of claim 10, in which the fixed and adaptive path navigation includes selecting search units based on a predefined walk path and the conditions associated with the fixed path navigation comprise a counter that is compared to a length of the walk path.

16. The chip of claim 10, in which the control logic controls the compare logic t execute compares for two or more reference windows using a separate fixed and adaptive navigation for each window.

17. A circuit, comprising:
    a motion estimation engine to compare source blocks from a source frame against reference blocks in a reference frame to find a suitable match for the source block, wherein groups of reference blocks are compared against the source block and search units within each group are selected for comparison using both a fixed path navigation and an adaptive path navigation, wherein the reference blocks defines at least two macro blocks, and wherein a macro block comprises a block of 8 by 8 pixels or 16 by 16 pixels, wherein fixed path navigation comprises a predefined sequence of search units based on the source block's position within a current frame where the search units are predefined before searching the source block begins, and wherein adaptive path navigation comprises search units that are dynamically determined based on prior comparison results and wherein adaptive path navigation is synchronized with fixed path navigation by taking into account conditions associated with the fixed path navigation.

18. The chip of claim 17, in which the motion estimation engine has block compare logic having partition comparators to compare corresponding sub blocks from a source and reference block being compared.

19. The chip of claim 17, wherein the motion estimation engine comprises match record logic to store error information generated from the comparisons.

20. The chip of claim 19, in which the match record logic stores error information for the reference block that is the best match with the source block.

21. A device, comprising:
(a) a chip having a motion estimation engine to compare source blocks from a source frame against reference blocks in a reference frame to find a suitable match for the source block, wherein groups of reference blocks are compared against the source block and search units with each group are selected for comparison using both a fixed path navigation and an adaptive path navigation, each search unit defining at least two macro blocks, wherein a macro block comprises a block of 8 by 8 pixels or 16 by 16 pixels, wherein fixed path navigation comprises a predefined sequence of search units based on the source block's position a current frame where the search units are predefined before searching the source block begins, and wherein adaptive path navigation comprises search units that are dynamically determined based on prior comparison results and wherein adaptive path navigation is synchronized with fixed path navigation by taking into account conditions related to a counter associated with the fixed path navigation;
(b) an antenna; and
(c) a wireless interface coupled to the antenna to communicatively link the chip to a wireless network.

22. The device of claim 21, in which the chip is a graphics processing chip.

23. The device of claim 21, in which the chip is a processor for a portable electronic device.

* * * * *